US012732292B2

(12) United States Patent
Kim et al.

(10) Patent No.: US 12,732,292 B2
(45) Date of Patent: Sep. 8, 2026

(54) MODEM CHIP EMPLOYING LOW COMPLEXITY LOG LIKELIHOOD RATIO CALCULATION AND OPERATING METHOD THEREOF

(71) Applicant: SAMSUNG ELECTRONICS CO., LTD., Suwon-si (KR)

(72) Inventors: Joohan Kim, Suwon-si (KR); Junyeong Seo, Suwon-si (KR); Youngseok Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 69 days.

(21) Appl. No.: 18/980,077

(22) Filed: Dec. 13, 2024

(65) Prior Publication Data

US 2025/0219747 A1 Jul. 3, 2025

(30) Foreign Application Priority Data

Dec. 29, 2023 (KR) ........................ 10-2023-0197723
Mar. 22, 2024 (KR) ........................ 10-2024-0039973

(51) Int. Cl.

| | |
|---|---|
| ***H04B 17/382*** | (2015.01) |
| ***H04B 1/10*** | (2006.01) |
| ***H04B 7/08*** | (2006.01) |
| ***H04B 17/336*** | (2015.01) |
| ***H04L 27/34*** | (2006.01) |

(52) U.S. Cl.

CPC ......... *H04B 17/382* (2015.01); *H04B 1/1027* (2013.01); *H04B 7/0854* (2013.01); *H04B 17/336* (2015.01); *H04L 27/3405* (2013.01)

(58) Field of Classification Search

CPC .. H04B 17/382; H04B 17/336; H04B 1/1027; H04B 7/0854; H04L 27/3405

See application file for complete search history.

(56) References Cited

U.S. PATENT DOCUMENTS

| | | | | |
|---|---|---|---|---|
| 7,421,035 | B1 | 9/2008 | Gardner et al. | |
| 7,433,432 | B2 | 10/2008 | Hoo | |
| 8,401,115 | B2 | 3/2013 | Amiri et al. | |
| 8,565,329 | B2 | 10/2013 | Papadopoulos et al. | |
| 9,319,249 | B2 * | 4/2016 | Chan | H04B 10/6161 |
| 9,337,911 | B2 | 5/2016 | Patel et al. | |
| 9,479,215 | B2 * | 10/2016 | Luschi | H04B 1/707 |
| 9,614,606 | B2 * | 4/2017 | Gopalan | H04B 7/0877 |
| 9,647,732 | B2 | 5/2017 | Zhou et al. | |
| 10,374,772 | B2 | 8/2019 | Suh et al. | |

(Continued)

FOREIGN PATENT DOCUMENTS

KR 10-1949031 B1 2/2019

*Primary Examiner* — Jaison Joseph

(74) *Attorney, Agent, or Firm* — Morgan, Lewis & Bockius LLP

(57) ABSTRACT

A modem chip includes a radio frequency integrated circuit (RFIC) configured to receive a signal including channel state information, and a processor configured to determine a signal to interference ratio (SIR) of the received signal based on the channel state information. The processor selects a log likelihood ratio (LLR) calculation mode among at least two LLR calculation modes that differently calculate an LLR of the received signal, by comparing the SIR with at least one threshold, and decodes the received signal by calculating the LLR of the received signal based on the selected LLR calculation mode.

20 Claims, 12 Drawing Sheets

(56) References Cited

U.S. PATENT DOCUMENTS

| | | | | |
|---|---|---|---|---|
| 11,431,440 | B2 | 8/2022 | Yang et al. | |
| 11,509,516 | B2 | 11/2022 | Zhan et al. | |
| 11,546,100 | B2 * | 1/2023 | Tesanovic | H04W 40/12 |
| 11,791,880 | B2 | 10/2023 | Zhan et al. | |
| 2006/0056496 | A1 * | 3/2006 | Smee | H04B 7/0854<br>375/E1.032 |
| 2008/0159373 | A1 * | 7/2008 | Taha | H04B 7/0871<br>375/232 |
| 2008/0279298 | A1 | 11/2008 | Ben-Yishai et al. | |
| 2009/0122890 | A1 * | 5/2009 | Wu | H04L 27/26524<br>375/261 |
| 2016/0065396 | A1 * | 3/2016 | Chan | H04L 25/03057<br>375/233 |
| 2024/0298200 | A1 * | 9/2024 | Fröberg Olsson | H04W 24/10 |
| 2025/0175269 | A1 * | 5/2025 | Bai | H04B 7/0452 |
| 2025/0184020 | A1 * | 6/2025 | Gerami | H04L 1/0019 |
| 2025/0219747 | A1 * | 7/2025 | Kim | H04L 27/3405 |
| 2025/0350500 | A1 * | 11/2025 | Kim | H04L 25/0202 |
| 2026/0089536 | A1 * | 3/2026 | Kim | H04L 25/0222 |
| 2026/0101281 | A1 * | 4/2026 | Kim | H04W 52/0209 |

* cited by examiner

| | Number of constellation points |
|---|---|
| TH(V0) | K0 |
| TH(V1) | K1 |
| TH(V2) | K2 |
| TH(V3) | K3 |
| TH(V4) | K4 |
| TH(V5) | K5 |
| TH(V6) | K6 |
| TH(V7) | K7 |

| | Number of constellation points |
|---|---|
| TH(V0) | K0 |
| TH(V1) | K1 |
| TH(V2) | K2 |
| TH(V3) | K3 |
| TH(V4) | K4 |
| TH(V5) | K5 |
| TH(V6) | K6 |
| TH(V7) | K7 |

TH_3

(TH(V3)<SIR<(TH(V2))

TH_2

MODEM CHIP EMPLOYING LOW COMPLEXITY LOG LIKELIHOOD RATIO CALCULATION AND OPERATING METHOD THEREOF

CROSS-REFERENCE TO RELATED APPLICATIONS

This application is based on and claims priority under 35 U.S.C. § 119 to Korean Patent Application No. 10-2023-0197723, filed on Dec. 29, 2023, and Korean Patent Application No. 10-2024-0039973, filed on Mar. 22, 2024, in the Korean Intellectual Property Office, the disclosures of which are incorporated by reference herein in their entireties.

TECHNICAL FIELD

This disclosure relates generally to a modem chip and an operating method thereof, and more specifically, to a modem chip that calculates a log likelihood ratio (LLR) of a received signal.

Discussion of Related Art

In modern wired and wireless communication technology and smart device-related technology, high decoding accuracy for signals received by a receiver of a wireless communication system has been required.

In general, a receiver may receive an encoded signal from a transmitter, decode the received signal, and obtain information transmitted by the transmitter. The receiver may calculate a log likelihood ratio to decode the received signal. In calculating the log likelihood ratio, as a modulation order and/or the number of layers (each layer corresponding to an independent data stream) of the received signal increases, the complexity of calculating the log likelihood ratio may increase. Therefore, a method for reducing the complexity of calculating the log likelihood ratio while preventing performance degradation is desired.

SUMMARY

Embodiments of the inventive concept provide a modem chip that reduces the complexity of calculating a log likelihood ratio (LLR) while preventing performance degradation by determining the number of constellation points used to calculate the LLR based on a signal to interference ratio (SIR) of a received signal, and an operating method of the modem chip. When SIR is relatively high, less constellation points may be used in the LLR calculation, such that a calculation method with reduced complexity may be used.

According to an aspect of the inventive concept, a modem chip includes a radio frequency integrated circuit (RFIC) configured to receive a signal including channel state information, and a processor configured to generate a signal to interference ratio (SIR) of the received signal based on the channel state information, wherein the processor selects one log likelihood ratio (LLR) calculation mode among at least two LLR calculation modes for differently calculating an LLR of the received signal by comparing the SIR with at least one threshold, and decodes the received signal by calculating the LLR of the received signal based on the selected one LLR calculation mode.

According to another aspect of the inventive concept, an operating method of a modem chip includes generating channel state information based on a received signal, generating a signal to interference ratio (SIR) of the received signal based on the channel state information, selecting a first threshold that is closest to the SIR among a plurality of thresholds, selecting one log likelihood ratio (LLR) calculation mode among at least two LLR calculation modes for differently calculating an LLR of the received signal based on the first threshold, and calculating the LLR of the received signal based on the selected one LLR calculation mode.

According to another aspect of the inventive concept, a modem chip includes a radio frequency integrated circuit (RFIC) configured to receive a signal including channel state information, and a processor configured to generate a channel matrix corresponding to the received signal based on the channel state information, generate a linear detection matrix for detecting a transmission vector included in the received signal based on the channel matrix, and generate a signal to interference ratio (SIR) of the received signal based on the channel matrix and the linear detection matrix, wherein the processor selects a log likelihood ratio (LLR) calculation mode among at least two LLR calculation modes for differently calculating an LLR of the received signal based on a first threshold that is closest to the SIR among a plurality of thresholds, and decodes the received signal by calculating the LLR of the received signal based on the selected LLR calculation mode.

BRIEF DESCRIPTION OF THE DRAWINGS

Embodiments of the inventive concept will be more clearly understood from the following detailed description taken in conjunction with the accompanying drawings in which:

FIG. 4 is a diagram illustrating the number of constellation points respectively corresponding to a plurality of thresholds, according to an embodiment;

FIG. 5 is a diagram illustrating a method of selecting the number of constellation points based on a signal to interference ratio (SIR), according to an embodiment;

FIGS. 6A and 6B are diagrams illustrating a method of selecting the number of constellation points based on SIR, according to an embodiment;

DETAILED DESCRIPTION OF EMBODIMENTS

Hereinafter, embodiments of the inventive concept are described in detail with reference to the attached drawings.

Figure 1:
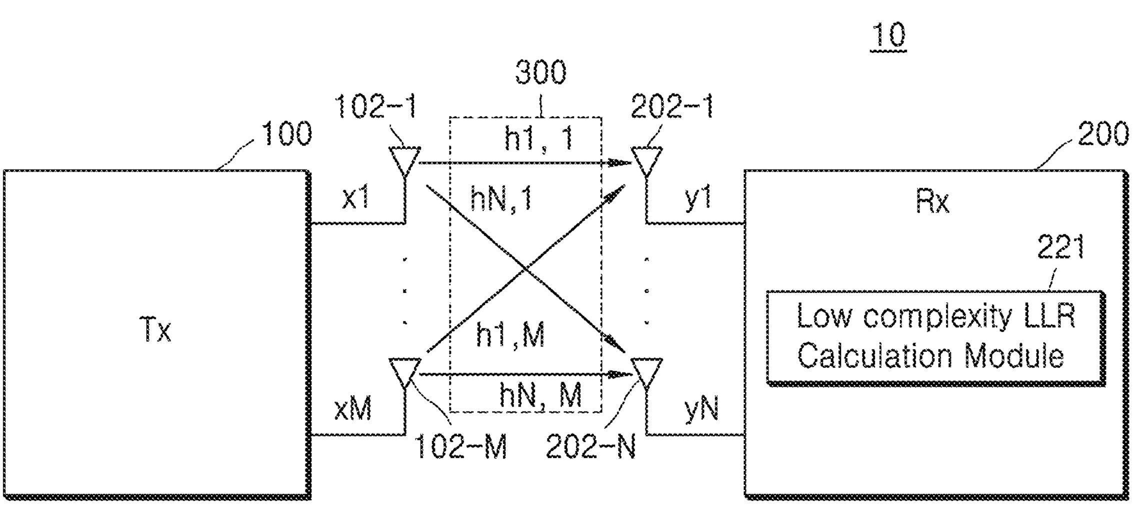
FIG. 1 is a block diagram illustrating a wireless communication system according to the inventive concept.

FIG. 1 is a block diagram illustrating a communication system according to an embodiment.

Referring to FIG. 1, a communication system 10 may include a transmitter 100 and a receiver 200 that communicate wirelessly through a multiple-input multiple-output (MIMO) channel 300.

The communication system 10 may be any system that includes the MIMO channel 300. In some embodiments, the communication system 10 may include a wireless communication system, such as, a fifth generation (5G) wireless system, a long term evolution (LTE) system, or WiFi, which are non-limiting examples. In some embodiments, the communication system 10 may include a wired communications system, such as a storage system or a network system (e.g., "gigabit Digital Subscriber Line (DSL)"). The communication system 10 is described below primarily with reference to a wireless communication system, but embodiments of the inventive concept are not limited thereto.

For example, the transmitter 100 may be a base station or a component included in the base station. The base station may refer to a fixed station that communicates with a terminal and/or other base stations and may transmit and receive data and/or control information through communication with a terminal and/or other base stations. The base station may also be referred to as a node B, an evolved-node B (eNB), a base transceiver system (BTS), or an access point (AP).

For example, the receiver 200 may be a terminal or a component included in the terminal. The terminal is a wireless communication device and may refer to various devices capable of transmitting and receiving data and/or control information through communication with the transmitter 100. For example, the terminal may be referred to as a user equipment, a mobile station (MS), a mobile terminal (MT), a user terminal (UT), a subscribe station (SS), a wireless device, a portable device, and so on.

A wireless communication network between the transmitter 100 and the receiver 200 may support multiple users communicating with each other by sharing available network resources. For example, in a wireless communication network, information may be transmitted in various ways, such as code division multiple access (CDMA), frequency division multiple access (FDMA), time division multiple access (TDMA), orthogonal frequency division multiple access (OFDMA), and single carrier frequency division multiple access (SC-FDMA).

The transmitter 100 may include a plurality of transmission antennas 102-1 to 102-M (hereinafter, M is a positive integer) and may transmit a plurality of symbols (x1 to xM) through each of the plurality of transmission antennas 102-1 to 102-M. Also, the receiver 200 may include a plurality of reception antennas 202-1 to 202-N (hereinafter, N is a positive integer), and may receive a plurality of symbols y1 to yN through each of the plurality of reception antennas 202-1 to 202-N.

For example, when a symbol vector transmitted from the transmitter 100 is represented as $x=[x1 \ldots xM]^T$, a symbol vector y received by the receiver 200 may be represented by Equation 1 below.

$$y = Hx + n = \begin{pmatrix} h1,1 & \ldots & h1,M \\ \vdots & \ddots & \vdots \\ hN,1 & \ldots & hN,M \end{pmatrix} \begin{pmatrix} x1 \\ \vdots \\ xM \end{pmatrix} + \begin{pmatrix} n1 \\ \vdots \\ nN \end{pmatrix} \quad \text{Equation 1}$$

In Equation 1, hi,j represents an effective channel gain between a $j^{th}$ (j is an integer from 1 to M) transmission antenna (or a "transmission layer") and an $i^{th}$ (i is an integer from 1 to N) reception antenna, and xj represents a transmission symbol from the jth transmission antenna.

The transmission symbol xj may be one of plural signal constellation points. A constellation point may refer to a point on a complex plane used by the transmitter 100 to map a transmitted signal. The number and position of constellation points on the complex plane may change depending on a modulation method of a transmitted signal. The modulation method may be determined based on a modulation order. As the modulation order increases, the number of constellation points according to a corresponding modulation method may increase. For example, when the transmitter 100 modulates a transmitted signal by using a quadrature phase shift keying (QPSK) method, one constellation point may be located in each quadrant of the complex plane, so that four constellation points may be used to modulate a transmitted signal. The transmitter 100, which modulates a transmitted signal by using the QPSK method, may map the transmitted signal to one of four constellation points and transmit the mapped signal to the receiver 200. In the following discussion, as an example, the modulation method of the transmitter 100 according to the inventive concept is described on the assumption that the modulation method is a QPSK method. In other examples, a transmitted signal may be modulated by using modulation method of, e.g., 16 QAM, 64 QAM, 256 QAM, or 1024 QAM.

Also, in Equation 1, ni represents additive white Gaussian noise (AWGN) from the $i^{th}$ reception antenna, and ni may have power (or variance) of $\sigma^2$. The AWGN may also include an interference signal. For example, the communication system 10 may consider noise of the reception antenna together with an influence of the interference signal. In this case, variances of the AWGNs of the plurality of reception antennas 202-1 to 202-N may be different from each other and spatially correlated, and hereinafter, it is assumed that powers of the AWGN of the plurality of reception antennas 202-1 to 202-N are identical and spatially uncorrelated. In this case, the AWGN may be the same as the noise with the whitening filter applied.

The receiver 200 according to the inventive concept may include a low complexity log likelihood ratio (LLR) calculation module 221. (Herein, any "module" may be processing circuitry of the processor 220 or other processor, executing instructions read from memory, or configured with specific hardware, to carry out the described tasks.) The low complexity LLR calculation module 221 according to the inventive concept may calculate a log likelihood ratio (LLR) based on a signal to interference ratio (SIR) of a received signal. The SIR may be calculated based on a linear detector (also, referred to as a linear detection matrix) described below. For example, the linear detector may be a minimum mean square error (MMSE) detector (also referred to as an MMSE detection matrix) described below. As described below, the receiver 200 may calculate an LLR by selecting one of at least two LLR calculation modes with different LLR calculation methods, based on the SIR. However, the receiver 200 according to the inventive concept is not limited thereto and may operate in modes other than the two LLR calculation modes. For example, the receiver 200 may operate in a mode in which the LLR is calculated based on a non-linear detector (also, referred to as a non-linear detection matrix) in addition to the two LLR calculation modes described below. For example, the receiver 200 according to the inventive concept may operate in a mode (referred to as a non-linear LLR calculation mode) for calculating an LLR based on the non-linear detection matrix when the complexity of LLR calculation based on the non-linear detection matrix is below a certain level. The complexity of LLR calculation based on the non-linear detection matrix may be determined by the number of layers used for signal transmission and reception, a modulation order, and so on. For example, when the number of layers used for signal transmission and reception is small and the modulation order is low, the complexity of LLR calculation based on the non-linear detection matrix may be below a certain level, and the receiver 200 according to the inventive concept may operate in a non-linear LLR calculation mode. In the non-linear LLR calculation mode, the receiver 200 may calculate an LLR based on the non-linear detection matrix. For example, the non-linear detector may be a maximum likelihood detector (ML detector).

The receiver 200 may decode a received signal based on an LLR. For example, when the LLR is a positive number, the receiver 200 may decode a bit of a corresponding symbol into "1", and when the LLR is a negative number, the receiver 200 may decode the bit of the corresponding symbol into "0". Thus, the LLR may signify a probability that a bit of the received signal is decoded into "0" or "1". Details on a method by which the receiver 200 calculates the SIR described above and the LLR are described below with reference to FIG. 3.

When the receiver 200 uses ML, which is a non-linear detection method, to calculate the LLR in a MIMO system, and when the number of antennas used for transmission and reception or a modulation order increases, the complexity of LLR calculation may increase. When the receiver 200 uses a linear detection method (for example, minimum mean square error (MMSE) or zero forcing) with relatively low complexity, the complexity of LLR calculation may be reduced, but performance may be reduced as compared to the ML method when SIR is low (i.e., when a high interference signal is present). For example, when the receiver 200 uses a linear detection method, block error ratio (BLER) performance may be reduced as compared to the ML method in the low SIR scenario.

The low complexity LLR calculation module 221 according to the inventive concept may calculate an LLR based on a linear detection method and reduce the complexity of LLR calculation and prevent performance from reducing by selecting an LLR calculation mode and/or method described below based on the SIR.

Figure 2:
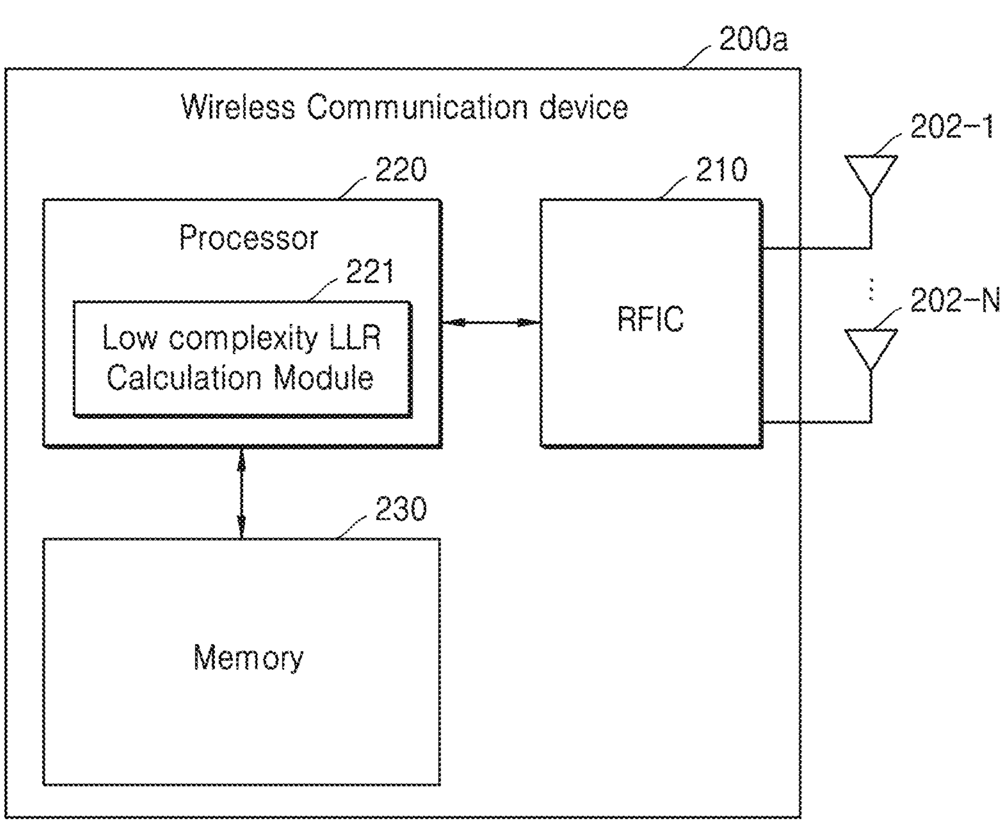
FIG. 2 is a block diagram illustrating a wireless communication device according to an embodiment.

FIG. 2 is a block diagram illustrating a wireless communication device according to an embodiment.

A wireless communication device 200*a* illustrated in FIG. 2 may correspond to the receiver 200 described above with reference to FIG. 1, and redundant descriptions thereof are omitted.

Referring to FIG. 2, the wireless communication device 200*a* according to the inventive concept may include a radio frequency integrated circuit (RFIC) 210, a processor 220, a memory 230, and a plurality of antennas 202-1 to 202-N. The wireless communication device 200*a* may further include various components in addition to the components illustrated in FIG. 2. The RFIC 210 and the processor 220 may be included in one modem chip. Accordingly, the wireless communication device 200*a* according to the inventive concept may include a modem chip that performs operations described below.

The wireless communication device 200*a* may be connected to a wireless communication system by transmitting and receiving a signal (may be referred to as data in the embodiments) through at least one of the plurality of antennas 202-1 to 202-N.

The RFIC 210 may transmit and receive a symbol vector (may be referred to as data in the embodiments) through at least one of the plurality of antennas 202-1 to 202-N. That is, at least some of the plurality of antennas 202-1 to 202-N may correspond to transmission antennas. The transmission antennas may transmit signals to an external device (for example, another wireless communication device or a base station (BS)) other than the wireless communication device 200*a*. At least some of the other of the plurality of antennas 202-1 to 202-N may correspond to reception antennas. The reception antennas may receive wireless signals from an external device.

The processor 220 may control all operations of the wireless communication device 200*a*, and for example, the processor 220 may be a central processing unit (CPU). The processor 220 may include one processor core (a single core) or may include a plurality of processor cores (a multi-core). The processor 220 may process or execute programs and/or data stored in the memory 230. In one embodiment, the processor 220 may control various functions of the wireless communication device 200*a* or perform various operations by executing programs stored in the memory 230.

The processor 220 according to the inventive concept may calculate a channel matrix (see Equation 1) based on channel state information, as described above with reference to FIG. 1. The processor 220 may obtain the channel state information from a signal received by the RFIC 210.

The processor 220 according to the inventive concept may include a low complexity LLR calculation module 221. The low complexity LLR calculation module 221 may include processing circuitry such as hardware including a logic circuit, a hardware/software combination such as a processor that executes the software, or a combination thereof. For example, more specifically, the processing circuitry include an arithmetic logic unit (ALU), a digital signal processor, a microcontroller, a field programmable gate array (FPGA), a microprocessor, and an application-specific integrated circuit (ASIC), or so on, but the inventive concept is not limited thereto.

The low complexity LLR calculation module 221 according to the inventive concept may reduce the complexity of LLR calculation without impacting decoding accuracy by calculating an SIR of a received symbol and selecting an LLR calculation mode.

Figure 3:
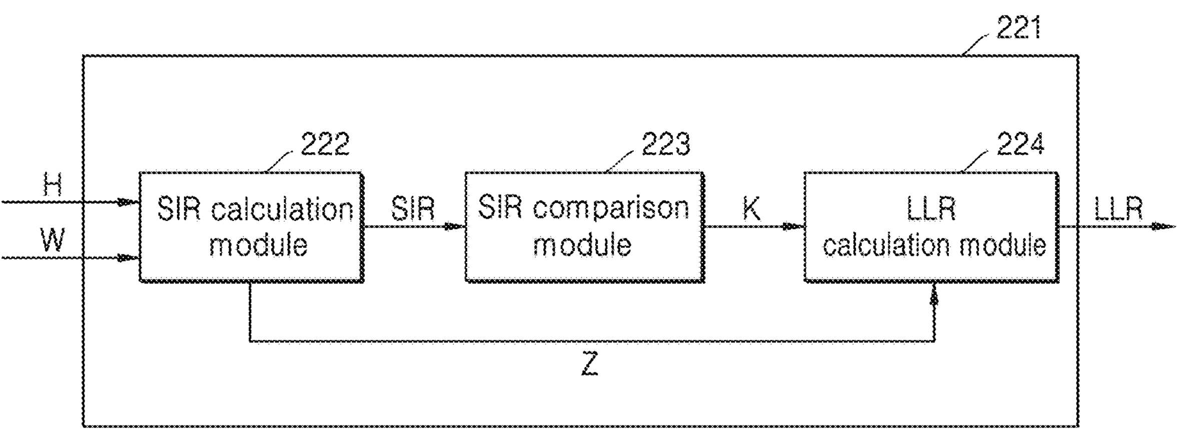
FIG. 3 is a block diagram illustrating a low-complexity log likelihood ratio (LLR) calculation module according to an embodiment.

FIG. 3 is a block diagram illustrating an example of the low complexity LLR calculation module 221 according to an embodiment. Here, the low complexity LLR calculation module 221 may include an SIR calculation module 222, an SIR comparison module 223, and an LLR calculation module 224.

As described above, the low complexity LLR calculation module 221 may include processing circuitry such as hardware including a logic circuit, a hardware/software combination such as a processor that executes the software, or a combination thereof. Although FIG. 3 illustrates that the low complexity LLR calculation module 221 includes separate components for convenience of description, the inventive concept is not limited thereto, and each component may be a piece of hardware or a combination of hardware and software.

The SIR calculation module 222 according to the inventive concept may receive a channel matrix H and linear detection matrix W of a received signal. The processor 220 illustrated in FIG. 2 may calculate the channel matrix H (see Equation 1) described above and generate the linear detection matrix W based on the channel matrix H. Note that the linear detection matrix W may sometimes be referred to as a linear detector. When the linear detection matrix W is an MMSE weight matrix, the linear detection matrix W may be calculated by Equation 2 below. Herein, the MMSE weight matrix may be referred to as an MMSE detection matrix. Other examples of the linear detection matrix W may include a zero forcing weight matrix.

$$W = (HH^H + \sigma_n^2 I)^{-1} H^H \quad \text{Equation 2}$$

In Equation 2, H is a channel matrix, I is an identity matrix, $$\sigma_n^2$$

is a noise variance, and $H^H$ is a Hermitian matrix of the channel matrix H.

The SIR calculation module 222 according to the embodiment may calculate an SIR based on the channel matrix H and the linear detection matrix W according to Equation 3 and Equation 4 below.

$$WH = \begin{bmatrix} \rho_{0,0} & \cdots & \varepsilon_{0,N-1} \\ \vdots & \ddots & \vdots \\ \varepsilon_{M-1,N} & \cdots & \rho_{M-1,N-1} \end{bmatrix} \quad \text{Equation 3}$$

$$SIR_m = \frac{\rho_{m,m}^2}{\sum_{n \neq m} |\varepsilon_{m,n}|^2} \quad \text{Equation 4}$$

In Equation 4, $SIR_m$ is an SIR for an $m^{th}$ layer, and $\rho_{m,m}$ and $\varepsilon_{m,n}$ for calculating $SIR_m$ may be calculated by referring to the corresponding matrix values in Equation 3. Referring to Equation 4 and Equation 3, the SIR calculation module 222 may calculate the SIR ($SIR_m$) of the $m^{th}$ layer based on components of an $m^{th}$ row of the matrix of Equation 3.

The SIR calculation module 222 according to the embodiment may calculate a reference symbol Z based on the channel matrix H and the linear detection matrix W. The reference symbol Z refers to a symbol estimated on a transmission vector (x in Equation 1) transmitted by the transmitter 100 illustrated in FIG. 1. The SIR calculation module 222 may calculate the reference symbol Z by using Equation 5 below based on the channel matrix H and the linear detection matrix W.

$$\begin{aligned} z &= Wy + Wn \\ &= Whx + Wn \end{aligned} \quad \text{Equation 5}$$

Equation 5 may be understood by referring to Equation 1 and Equation 2. Referring to Equation 3 and Equation 5, the reference symbol Z may be represented as z0, . . . , zM. Hereinafter, for convenience of description, it is assumed that the reference symbol Z is a single symbol included in z0, . . . , zM. Similarly, it is assumed that the SIR is an SIR of a layer corresponding to the reference symbol Z.

The SIR comparison module 223 according to the inventive concept may receive the SIR. The SIR comparison module 223 may compare the SIR with a preset threshold and generate a number K of constellation points used for LLR calculation as a result of the comparison. The SIR comparison module 223 according to the embodiment may select a second threshold having the highest value among at least one first threshold having a value less than the SIR among a plurality of preset thresholds. The SIR comparison module 223 may transmit the number K of constellation points corresponding to the selected second threshold to the LLR calculation module 224. The LLR calculation module 224 according to the embodiment may receive the number K of constellation points and the reference symbol Z, and calculate an LLR for the reference symbol Z based on the number K of constellation points. The LLR calculation module 224 according to the embodiment may calculate an LLR by using Equation 6 below.

$$LLR(b_{m,k}) \approx \log\left( \frac{\max_{x_{m,k} \in (C^M)^+_{m,k}} \exp\left(-\frac{\|y - Hx_{m,k}\|^2}{2\sigma^2}\right)}{\max_{x_{m,k} \in (C^M)^-_{m,k}} \exp\left(-\frac{\|y - Hx_{m,k}\|^2}{2\sigma^2}\right)} \right) = \frac{1}{2\sigma^2}\left( \min_{x_{m,k} \in (C^M)^-_{m,k}} \|y - Hx_{m,k}\|^2 - \min_{x_{m,k} \in (C^M)^+_{m,k}} \|y - Hx_{m,k}\|^2 \right) \quad \text{Equation 6}$$

In Equation 6, $b_{m,k}$ may mean a $k^{th}$ bit (k is a positive integer) of a symbol transmitted from an $m^{th}$ transmission antenna (or an $m^{th}$ transmission layer) (m is a positive integer from 1 to M). In addition, $$(C^M)^+_{m,k}$$

represents a set of transmitted signal vectors in which $b_{m,k}$ of $C^M$, which is a set of signal vectors transmitted from the transmitter 100 illustrated in FIG. 1, is "+1", and $$(C^M)^-_{m,k}$$

represents a set of transmitted signal vectors in which $b_{m,k}$ of $C^M$, which is a set of signal vectors transmitted from the transmitter 100, is "−1". For example, when $b_{m,k}$ is "+1", $b_{m,k}$ may be bit 0, and when $b_{m,k}$ is "−1", $b_{m,k}$ may be bit 1. According to Equation 6, a Euclidean distance for all of transmitted signal vectors may be calculated, and the smallest value has to be obtained according thereto, and thus, as the number of transmission antennas (or transmission layers) increases or a modulation order increases, the complexity of implementation may also increase. Therefore, to reduce the complexity of LLR calculation, the LLR calculation module 224 may calculate an LLR based on n candidates instead of searching (or calculation of the Euclidean distance) for a combination of all constellation points. However, as the n value increases, the complexity of calculation and power consumption increases, and as the n value decreases, performance may be reduced. The n value corresponds to the number K of constellation points described above.

As described above, the low complexity LLR calculation module 221 according to the embodiment may calculate an LLR by using the linear detection matrix W for each subcarrier (for the case of a multi sub-carrier communication scheme) according to a channel situation and/or an electromagnetic field situation (e.g., when SIR is high). Further, the LLR may be calculated using a number K of constellation points adaptively determined according to the SIR, without using the number K of certain fixed constellation points, and thus desired decoding accuracy may be maintained while the complexity of LLR calculation may be reduced.

As described above, the SIR comparison module 223 according to the embodiment may select a second threshold having the highest value among at least one first threshold having a value that is less than an SIR among a plurality of preset thresholds. The low complexity LLR calculation module 221 may calculate an LLR based on the number K of constellation points corresponding to the selected second threshold.

The LLR calculation mode described above may include a linear detection mode and a "K-detection mode". Herein, the linear detection mode may be referred to as a first LLR calculation mode, and the K-detection mode may be referred to as a second LLR calculation mode. The K-detection mode may differ from the first LLR detection mode at least by using a higher number of constellation points for the LLR calculation (and in some cases using a non-linear detection mode rather than a linear detection mode). The SIR comparison module 223 according to the inventive concept may select an LLR calculation mode by comparing the SIR with a preset threshold. Specifically, the SIR comparison module 223 may select one of the linear detection mode and the K-detection mode by comparing the SIR with the preset threshold. The low complexity LLR calculation module 221 may calculate the LLR by operating in the selected mode.

The SIR comparison module 233 according to another embodiment may compare the SIR with a plurality of preset thresholds and select two thresholds that are closest to the SIR. The SIR comparison module 233 may determine the number K of constellation points based on at least one of the two selected thresholds. The low complexity LLR calculation module 221 may calculate the LLR based on the determined number K of constellation points.

FIG. 4 is a diagram illustrating the number of constellation points corresponding to each of a plurality of thresholds, according to an embodiment.

FIG. 4 may be described below based on the descriptions given with reference to FIGS. 1 to 3, and redundant descriptions thereof are omitted.

A table 40 of FIG. 4 illustrates number K0 to K7 of constellation points respectively corresponding to a plurality of SIR comparison thresholds TH(V0) to TH(V7) respectively having a first value to an eighth value. For example, referring to FIG. 4, the number of constellation points corresponding to the threshold TH(V0) having the first value is K0, and the number of constellation points corresponding to the threshold TH(V0) having the second value is K1.

Magnitudes of the plurality of thresholds TH(V0) to TH(V7) shown in the table 40 of FIG. 4 are different from each other, that is, the threshold TH(V0) having the first value may be greater than the threshold TH(V1) having the second value, the threshold TH(V1) having the second value may be greater than the threshold TH(V2) having the third value, the threshold TH(V2) having the third value may be greater than the threshold TH(V3) having the fourth value, the threshold TH(V3) having the fourth value may be greater than the threshold TH(V4) having the fifth value, the threshold TH(V4) having the fifth value may be greater than the threshold TH(V5) having the sixth value, the threshold TH(V5) having the sixth value may be greater than the threshold TH(V6) having the seventh value, and the threshold TH(V6) having the seventh value may be greater than the threshold TH(V7) having the eighth value. For convenience of description, the description is made below on the premise of a relationship between the plurality of threshold values described above, but the inventive concept is not limited thereto. For example, in another embodiment, among the plurality of thresholds TH(V0) to TH(V7), the threshold TH(V7) having the eighth value is the highest, and the threshold TH(V0) having the first value is the smallest. Also, the number of thresholds TH(V0) to TH(V7) illustrated in the table 40 of FIG. 4 is an example and may be more or fewer than the number of thresholds illustrated in the table 40.

The magnitudes of thresholds according to the inventive concept may be inversely proportional to the number of constellation points corresponding to the thresholds. For example, a first number K0 of constellation points may be less than a second number K1 of constellation points. As described above, a relationship between the first number K0 to the eighth number K7 of constellation points may be understood. Also, the number of constellation points used to calculate the SIR and LLR according to the inventive concept may also be inversely proportional. As is described below, as the SIR increases, the magnitude of the selected threshold may increase, and accordingly, the number of constellation points used for LLR calculation may decrease.

The plurality of threshold values TH(V0) to TH(V7) according to the embodiment may be preset values. The plurality of thresholds TH(V0) to TH(V7) according to the embodiment may be determined based on a signal to noise ratio (SNR) of a received signal. For example, the threshold TH(V0) having the first value may be 10 times the SNR of a received signal, and the threshold TH(V1) having the second value may be eight times the SNR of the received signal. The examples described above are for convenience of description, and the inventive concept is not limited thereto. Also, the number of constellation points corresponding to a plurality of thresholds may be set in advance.

As described above, the SIR comparison module 223 illustrated in FIG. 3, according to the inventive concept, may select one of a linear detection mode and a K-detection mode by comparing an SIR with a threshold. Specifically, the SIR comparison module 233 illustrated in FIG. 3 may compare an SIR with the highest threshold among a plurality of preset thresholds, and select the linear detection mode when the SIR is greater than the highest threshold. The low complexity LLR calculation module 221 illustrated in FIG. 3 may operate in the linear detection mode. The linear detection mode refers to a mode in which an LLR is calculated based on the linear detection matrix W which is illustrated in FIG. 3 and described above with reference to FIG. 3. For example, the linear detection matrix W illustrated in FIG. 3 may be an MMSE detection matrix. For example, referring to FIG. 4, the SIR comparison module 223 illustrated in FIG. 3 may compare the threshold TH(V0) having the highest first value among the plurality of thresholds TH(V0) to TH(V7) with an SIR, and when the SIR is greater than the threshold TH(V0) having the first value, the SIR comparison module 223 may select a linear detection mode. Accordingly, the low complexity LLR calculation module 221 illustrated in FIG. 3 may operate in the linear detection mode.

When the SIR is greater than the highest threshold among the plurality of thresholds, this may mean that the influence of interference on a received symbol corresponding to the SIR is small. Therefore, even when an LLR is calculated based on the linear detection matrix W which is illustrated in FIG. 3 and has relatively poor detection performance and low complexity, the LLR may be calculated more accurately.

Therefore, the low complexity LLR calculation module 221 illustrated in FIG. 3 operates in a linear detection mode when an SIR is greater than the highest threshold among the plurality of thresholds, and thus, the complexity of LLR calculation and power consumption may be reduced.

Compared to the first LLR calculation mode (e.g., a linear detection mode using a minimal number of constellation points) described above, the complexity and power consumption of a K-detection mode may be relatively high. However, the accuracy of LLR calculation in the K-detection mode may be relatively high in a low SIR environment. Also, as the number K of constellation points used for LLR calculation in K-detection mode increases, complexity, power consumption, and accuracy may increase. (As mentioned, the second LLR calculation mode may be a linear detection mode or a non-linear detection mode. It is further noted that in the first LLR calculation mode, the number of constellation points used for the LLR calculation may also correspond to the first threshold, which in the case of the first LLR calculation mode is the highest threshold.)

According to the embodiment, the SIR comparison module 233 illustrated in FIG. 3 may compare an SIR with the highest threshold among a plurality of preset thresholds, and select the K-detection mode when the SIR is less than the largest threshold. In the K-detection mode, the SIR comparison module 233 illustrated in FIG. 3 may select the number of constellation points used for LLR calculation based on the second threshold, which is the highest among at least one first threshold less than an SIR among the plurality of threshold values, as described above. This is described below with reference to FIG. 5.

Figure 5:
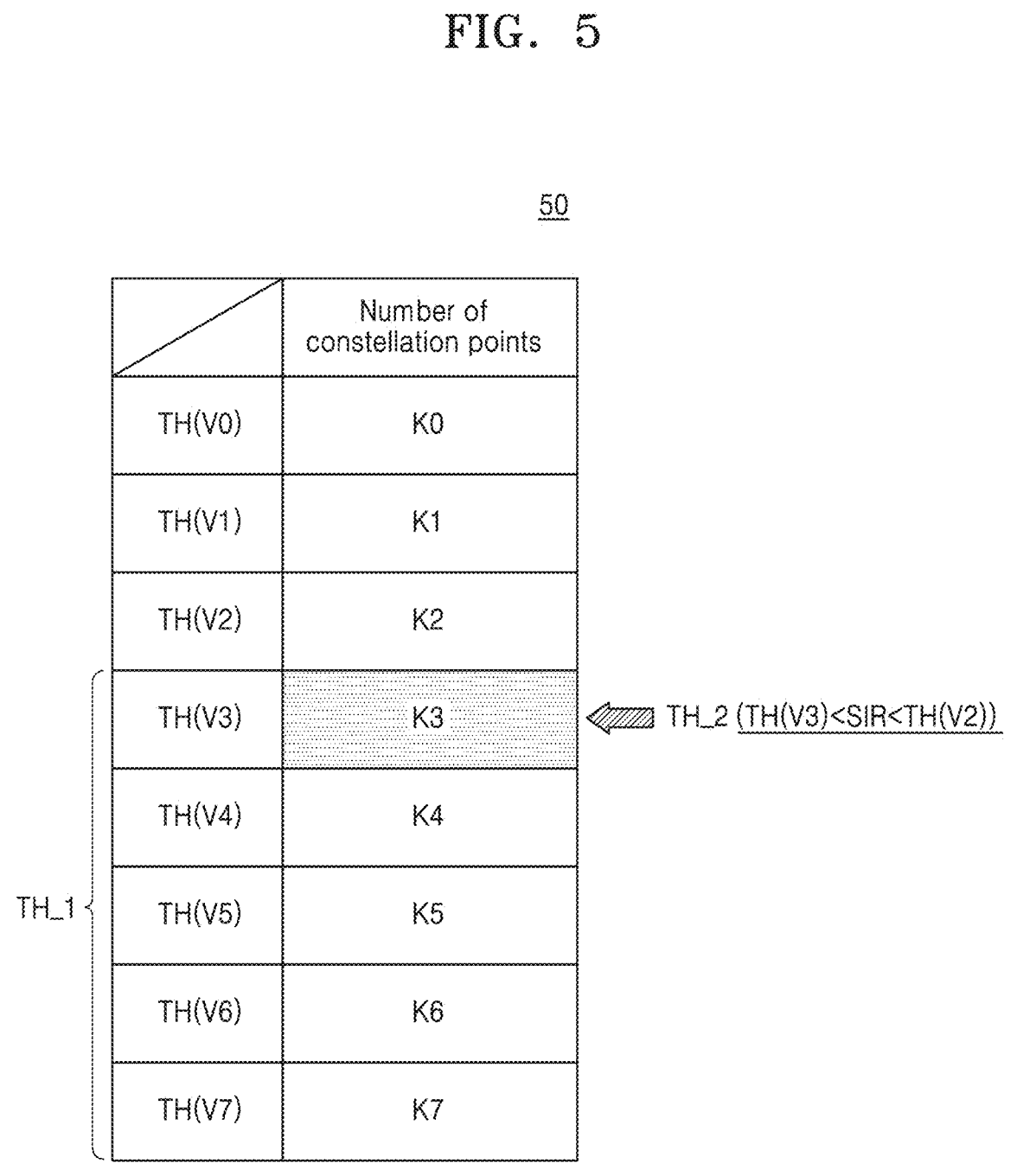

FIG. 5 is a diagram illustrating a method of selecting the number of constellation points based on an SIR according to an embodiment.

A table 50 illustrated in FIG. 5 is the same as the table 40 illustrated in FIG. 4, and FIG. 5 may be described by referring to the description made with reference to FIG. 4.

Referring to FIG. 5, an SIR is less than a threshold TH(V0) having a first value, and accordingly, the low complexity LLR calculation module 221 illustrated in FIG. 3 according to the inventive concept may operate in a K-detection mode. Thereafter, the SIR comparison module 233 illustrated in FIG. 3 may select a number K3 of constellation points corresponding to at least one of thresholds TH(V3) to TH(V7) that are less than the SIR, that is, a second threshold TH_2, which is a threshold TH(V3) having a fourth value that is the highest value among first thresholds TH_1. Therefore, the LLR calculation module 224 illustrated in FIG. 3, according to the inventive concept, may calculate an LLR based on the number K3 of the constellation points.

Unlike the example described above, the SIR comparison module 233 illustrated in FIG. 3, according to another embodiment, may select the number K2 of constellation points corresponding to the threshold TH(V2) having a third value which is the smallest value among threshold values TH(V0) to TH(V2) that are greater than the SIR. Therefore, the LLR calculation module 224 illustrated in FIG. 3, according to the inventive concept, may calculate an LLR based on the number K2 of the constellation points.

Referring to the above description, the low complexity LLR calculation module 221 illustrated in FIG. 3, according to the embodiment, may calculate an LLR based on any one of two thresholds (for example, TH(V2) and TH(V3)) having values that are closest to the SIR.

The low complexity LLR calculation module 221 illustrated in FIG. 3, according to the inventive concept, may select an LLR calculation mode based on an SIR, and select the number of constellation points based on the SIR when the selected mode is a K-detection mode, and thus, performance may be prevented from being reduced, and the complexity of LLR calculation may be reduced.

Figure 6B:
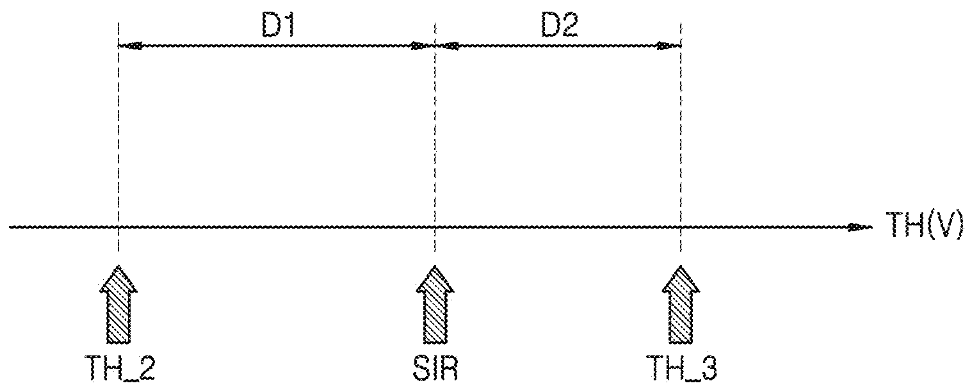

FIGS. 6A and 6B are diagrams illustrating a method of selecting the number of constellation points based on an SIR, according to an embodiment.

A table 60 illustrated in FIG. 6A is the same as the table 40 illustrated in FIG. 4, and FIGS. 6A and 6B may be described by referring to the descriptions made with reference to FIGS. 4 and 5. As in FIG. 5, an SIR illustrated in FIG. 6 may be greater than a threshold TH(V3) having a fourth value and be less than a threshold TH(V2) having a third value.

Unlike the embodiment described above with reference to FIG. 5, the low complexity LLR calculation module 221 illustrated in FIG. 3, according to the inventive concept, may calculate an LLR based on two thresholds (for example, TH(V2) and TH(V3)) having values that are closest to the SIR.

For example, referring to FIG. 6A, the low complexity LLR calculation module 221 illustrated in FIG. 3 according to the embodiment may calculate an LLR based on an average (or based on interpolation) of numbers (that is, K3 and K2) of constellation points respectively corresponding to two thresholds which are closest to the SIR, that is, a second threshold TH_2 and a third threshold TH_3. Accordingly, the low complexity LLR calculation module 221 illustrated in FIG. 3 may calculate an LLR by using the number of constellation points corresponding to an average value of K2 and K3 (or an interpolated value based on how close the SIR is to TH_2 as compared to TH_3).

Similarly to the description made above with reference to FIG. 6A, referring to FIG. 6B, the low complexity LLR calculation module 221 illustrated in FIG. 3, according to the embodiment, may calculate an LLR based on a combination of numbers of constellation points respectively corresponding to two thresholds which are closest to the SIR, that is, the second threshold TH_2 and the third threshold TH_3.

The second threshold TH_2 illustrated in FIG. 6B is the threshold TH(V3) having the fourth value as illustrated in FIG. 6A, and the third threshold TH_3 illustrated in FIG. 6B is the threshold TH(V2) having the third value as illustrated in FIG. 6A.

Referring to FIG. 6B, the SIR may be greater than the second threshold TH_2 and less than the third threshold TH_3. A difference between the SIR and the second threshold TH_2 is a first difference D1, and a difference between the SIR and the third threshold TH_3 is a second difference D2. The low complexity LLR calculation module 221 illustrated in FIG. 3, according to the inventive concept, may determine the number (K in FIG. 3) of constellation points based on two thresholds that are closest to the SIR (e.g. TH_2 and TH_3) and the SIR differences (for example, D1 and D2). For example, referring to Equation 7 below along with FIGS. 6A and 6B, the number of (K in FIG. 3) constellation points may be determined as follows.

$$K = \frac{D1 \times K2 + D2 \times K3}{D1 + D2} \quad \text{Equation 7}$$

Therefore, as described above, the low complexity LLR calculation module 221 illustrated in FIG. 3, according to the embodiment, may calculate an LLR based on a combination of numbers of constellation points respectively corresponding to two thresholds that are closest to the SIR. However, the inventive concept is not limited thereto, and the combination of the numbers of constellation points respectively corresponding to the two thresholds may change.

When a result of the average or combination of the numbers of constellation points respectively corresponding to the two thresholds is not an integer, the number of constellation points may be determined by rounding up, or rounding down.

Referring to the above description, the low complexity LLR calculation module 221 illustrated in FIG. 3, according to the inventive concept, may use fewer constellation points in calculating an LLR as an SIR is increased, and may use more constellation points in calculating the LLR as the SIR is decreased. That is, the low complexity LLR calculation module 221 illustrated in FIG. 3, according to the inventive concept, may adaptively determine the number of constellation points used for LLR calculation, according to the SIR.

Referring to the above description, when the SIR is less than the threshold TH(V7) having an eighth value, that is, the smallest threshold among the plurality of thresholds, the SIR may be evaluated to be relatively low, which may mean that a channel state is unstable. Accordingly, the low complexity LLR calculation module 221 illustrated in FIG. 3 may calculate an LLR based on all of a plurality of constellation points based on a combination of the number of transmission antennas and reception antennas and a modulation order to calculate an accurate LLR.

Although not illustrated in FIGS. 4 to 6B, when an SIR is equal to a certain threshold, the low complexity LLR calculation module 221 illustrated in FIG. 3, according to the inventive concept, may calculates an LLR based on the number of constellation points corresponding to the certain threshold.

Figure 7:
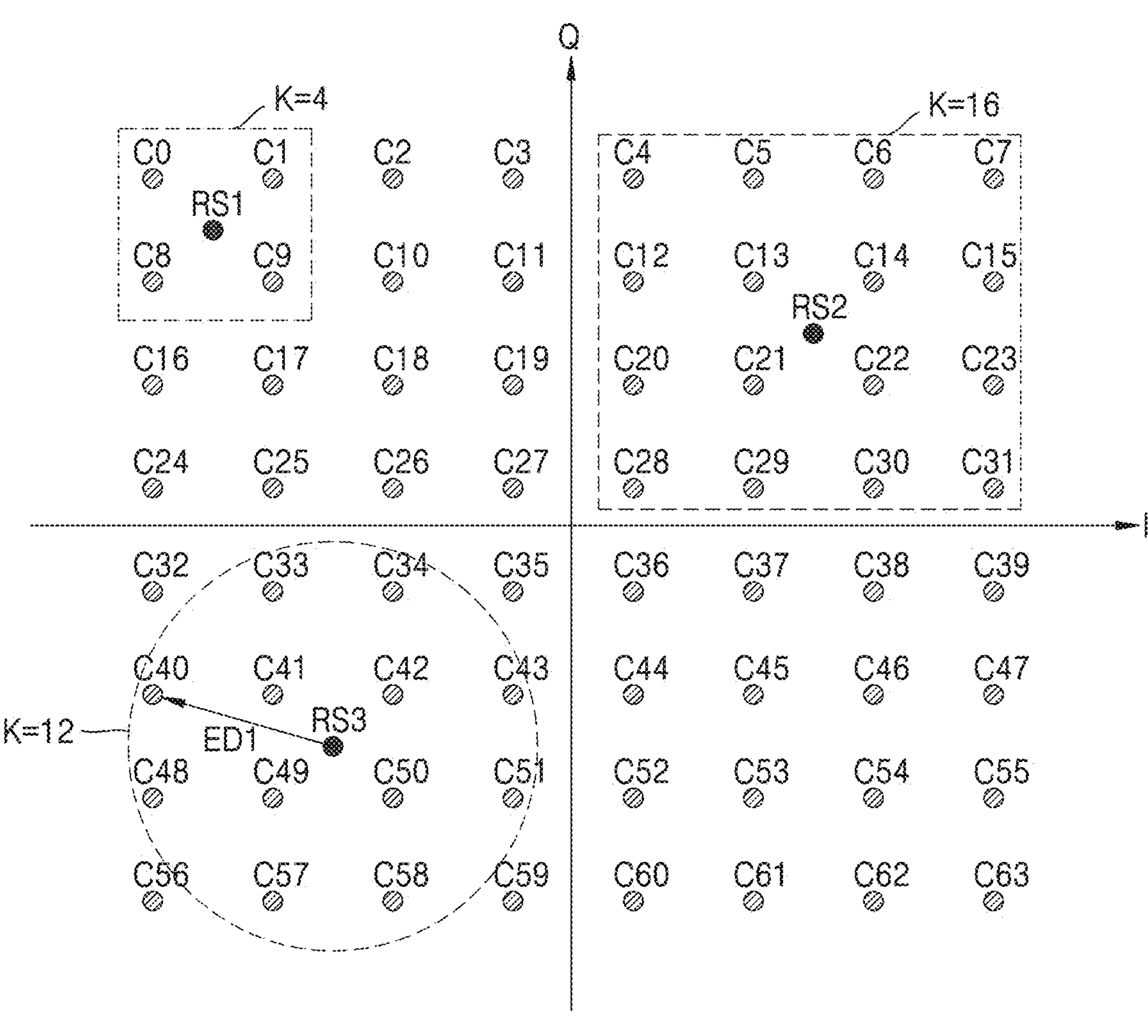
FIG. 7 is a diagram illustrating the number of constellation points used for LLR calculation according to an embodiment.

FIG. 7 is a diagram illustrating the number of constellation points used for LLR calculation according to an embodiment.

FIG. 7 illustrates all of a plurality of constellation points C0 to C63 corresponding to a quadrature amplitude modulation (QAM) method (64 QAM) applied to a transmitted signal. For convenience of description, FIG. 7 illustrates the plurality of constellation points C0 to C63 according to 64 QAM In other examples, a modulation method may be any one of QPSK, 16 QAM, 256 QAM, or 1024 QAM, which would utilize four, 16, 256 or 1024 constellation points, respectively.

As described above, the SIR comparison module 223 illustrated in FIG. 3, according to the inventive concept, may operate in a K-detection mode, and the SIR comparison module 223 illustrated in FIG. 3, operating in the K-detection mode may select the number (K in FIG. 3) of constellation points based on the SIR. Hereinafter, a method of selecting a constellation point based on the number (K in FIG. 3) of selected constellation points is described with reference to FIG. 7.

Referring to FIG. 7, the number of selected constellation points corresponding to a first reference symbol RS1 may be 4 (K=4). As represented by Equation 5, a first reference symbol RS1 may be calculated based on the channel matrix H in FIG. 3 and the linear detection matrix W in FIG. 3. Herein, a reference symbol may be referred to as an initial point.

Based on the number (K=4) of constellation points selected corresponding to the first reference symbol RS1, four constellation points C0, C1, C8, and C9 may be used for LLR calculation for the first reference symbol RS1. In this case, the selected constellation points may be the four constellation points that are closest (in terms of Euclidean distances) to the first reference symbol RS1.

Referring to FIG. 7, the number of selected constellation points corresponding to a second reference symbol RS2 may be 16 (K=16). Based on the number (K=16) of selected constellation points corresponding to the second reference symbol RS2, 16 constellation points C4, C5, C6, C7, C12, C13, C14, C15, C20, C21, C22, C23, C28, C29, C30, and C31 may be used. In this case, the selected constellation points may be the 16 constellation points that are closest (in terms of Euclidean distances) to the second reference symbol RS2.

Referring to FIG. 7, the number of constellation points selected corresponding to a third reference symbol RS3 may be 12 (K=12). Based on the number (K=12) of constellation points selected corresponding to the third reference symbol RS3, 12 constellation points C33, C34, C40, C41, C42, C43, C48, C49, C50, C51, C57 and C58) may be used. In this case, the selected constellation points may be the 12 constellation points that are closest (in terms of Euclidean distances) to the third reference symbol RS3.

A constellation point adjacent to the reference symbol may be determined based on a Euclidean distance from the reference symbol. For example, a $41^{st}$ constellation point C40 is separated from the third reference symbol RS3 by a first Euclidean distance ED1. Therefore, K constellation points having the shortest Euclidean distance from the reference symbol may be used for the LLR calculation for the reference symbol.

As described above, when the low complexity LLR calculation module 221 illustrated in FIG. 3, according to the inventive concept, operates in a K-detection mode, the linear detection matrix W (see Equation 2 above) illustrated in FIG. 3 is required to be calculated to find out an initial point (that is, the reference symbol). Therefore, even when the low complexity LLR calculation module 221 illustrated in FIG. 3, according to the inventive concept, operates in a linear detection mode, additional complexity according to calculation of the linear detection matrix W illustrated in FIG. 3 is not required.

Figure 8:
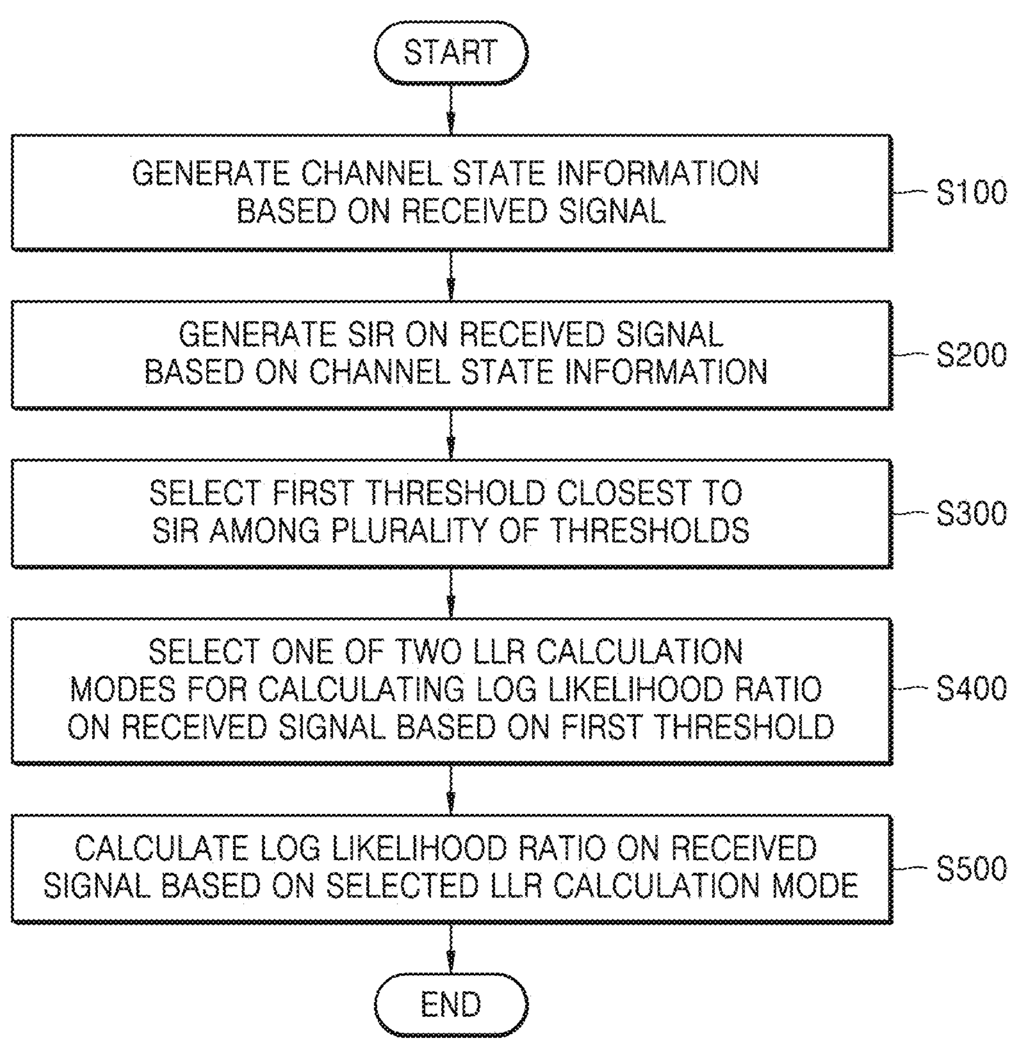
FIG. 8 is a flowchart illustrating an operating method of a modem chip, according to an embodiment.

FIG. 8 is a flowchart illustrating an operating method of a modem chip, according to an embodiment.

Referring to FIG. 8, in operation S100, a modem chip may generate channel state information based on a received signal.

In operation S200, the modem chip may generate an SIR of the received signal based on the channel state information.

In operation S300, the modem chip may select a first threshold that is closest to the SIR among a plurality of thresholds. The modem chip may determine whether the first threshold is the highest threshold among the plurality of thresholds.

In operation S400, the modem chip may select one of two LLR calculation modes for calculating an LLR on a received signal based on the first threshold.

When the first threshold is the highest threshold among the plurality of thresholds, the modem chip according to an embodiment, may select a first LLR calculation mode (e.g., a linear detection mode) for calculating an LLR based on a linear detection matrix based on the channel state information. Here, the linear detection matrix may be an MMSE detection matrix.

A modem chip according to another embodiment may select a second LLR calculation mode (e.g., a "K-detection mode") for calculating an LLR based on the number of first constellation points corresponding to the first threshold and a reference symbol corresponding to a received signal when the highest value among the plurality of thresholds is a second threshold. The first number of constellation points may increase as a difference between the first threshold and the second threshold increases. (It should be noted that in the second LLR calculation mode may be a linear detection mode or a non-linear detection mode. It is further noted that in the first LLR calculation mode, the number of constellation points used for the LLR calculation may also correspond to the first threshold, which in the case of the first LLR calculation mode is the highest threshold.)

In operation S500, the modem chip may calculate the LLR of the received signal based on the selected LLR calculation mode.

The modem chip according to the embodiment may calculate the LLR of the received signal based on a first LLR calculation mode (a linear detection mode) when the first threshold is the highest threshold among the plurality of thresholds.

A modem chip according to an embodiment may calculate the LLR of the received signal based on the second LLR calculation mode, which is a K-detection mode when the highest value among the plurality of thresholds is the second threshold. The modem chip may further calculate the LLR based on a second number of constellation points corresponding to a third threshold, which is closest to the SIR, next to the first threshold. For example, the modem chip may determine the number of constellation points used to calculate the LLR based on an average or a combination of the first number of constellation points and the second number of constellation points.

Figure 9:
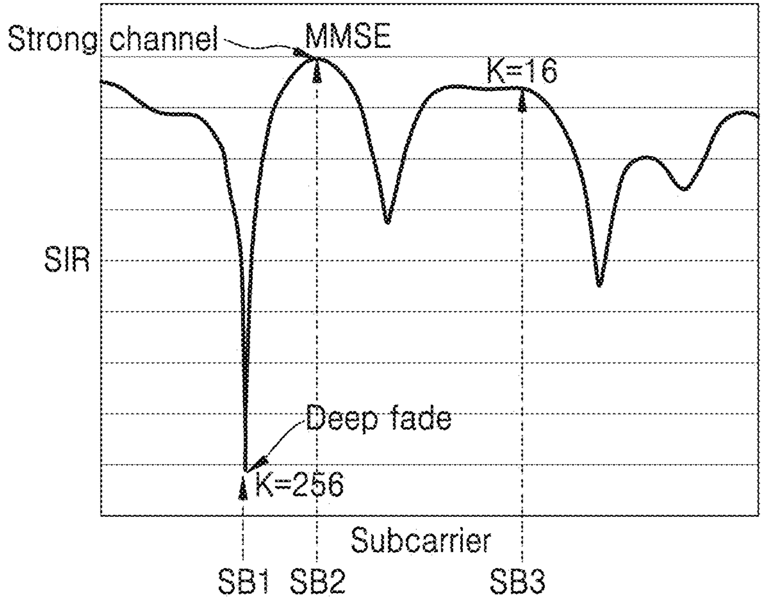
FIG. 9 is a graph illustrating an operation of a wireless communication device that adaptively selects an LLR calculation mode based on SIR, according to an embodiment.

FIG. 9 is a diagram illustrating an operation of a wireless communication device that adaptively selects an LLR calculation mode based on a SIR, according to an embodiment. In this example, QAM256 modulation is assumed, such that a maximum of 256 constellation points (K=256) may be used for demodulation.

A vertical axis in FIG. 9 denotes an SIR, and a horizontal axis denotes a subcarrier. Specifically, FIG. 9 illustrates detection modes (a linear detection mode and a K-detection mode) selected according to an SIR for each subcarrier.

As shown in FIG. 9, an SIR of a first subcarrier SB1 is the smallest SIR among SIRs for each subcarrier illustrated in FIG. 9. Therefore, a channel for the first subcarrier SB1 may be unstable, and 256 constellation points may be used to calculate an LLR on the first subcarrier SB1. In this case, the complexity of LLR calculation may be highest as described above.

An SIR of the second subcarrier SB2 is the highest SIR among the SIRs for each subcarrier illustrated in FIG. 9. Therefore, the channel for the second subcarrier SB2 may be stable, and no constellation points may be used to calculate an LLR on the second subcarrier SB2. In this case, the low complexity LLR calculation module 221 illustrated in FIG. 3, according to the inventive concept, may calculate the LLR on the second subcarrier SB2 based on the linear detection matrix W illustrated in FIG. 3 (e.g., a linear detection matrix). In this case, the complexity of LLR calculation may be reduced as described above.

An SIR of a third subcarrier SB3 is one of greater SIRs for each subcarrier illustrated in FIG. 9. Therefore, a channel for the third subcarrier SB3 may be relatively stable, and 16 constellation points may be used to calculate an LLR on the third subcarrier SB3.

As described above, the low complexity LLR calculation module (21 illustrated in FIG. 3) according to the inventive concept, may reduce the complexity of LLR calculation, power consumption, and required time by minimizing the constellation points used for the LLR calculation based on SIRs. As a result, an efficient LLR calculation may be performed.

Figure 10:
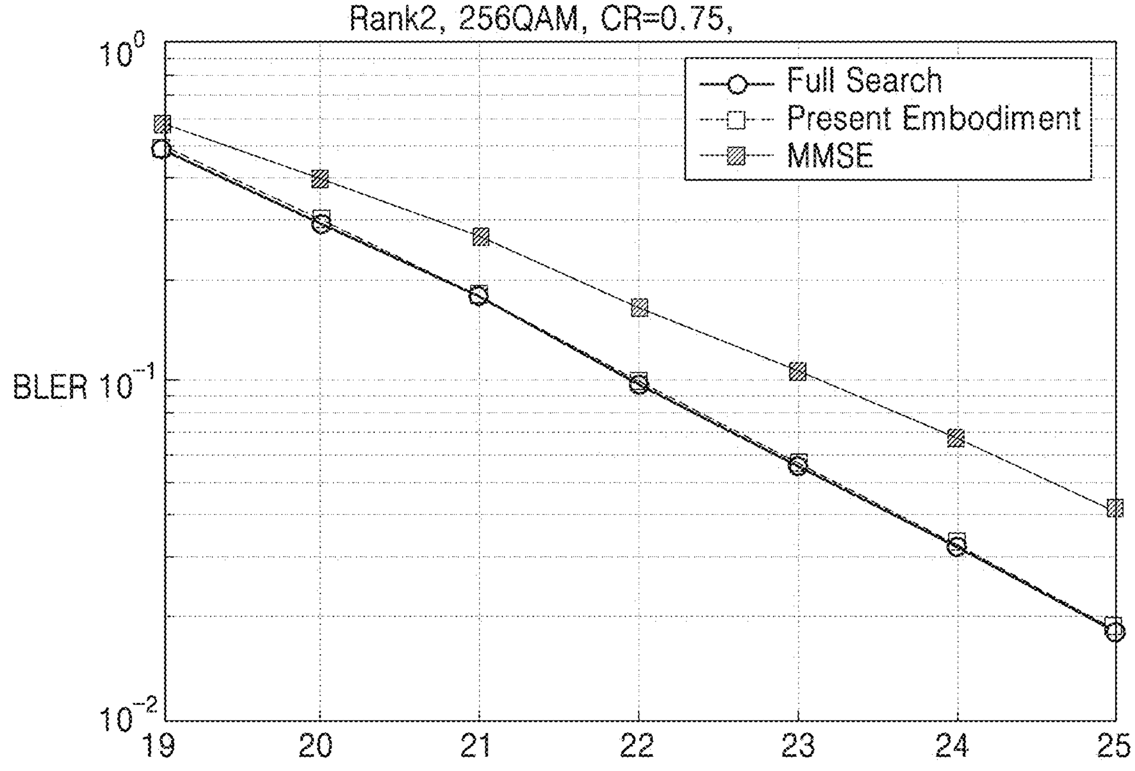
FIG. 10 is a diagram illustrating a block error ratio according to an embodiment.

FIG. 10 is a graph illustrating a block error ratio according to an embodiment.

FIG. 10 illustrates a block error ratio (BLER) according to the inventive concept, an MMSE detection matrix (using a linear detection matrix), and a full search (for example, ML as a non-linear detection matrix (referred to as a non-linear detector)).

Referring to FIG. 10, it can be seen that a BLER according to a full search is similar to a BLER according to the inventive concept. However, the inventive concept may have lower complexity than the full search. As described above, when using the MMSE detection matrix, it can be seen that the performance on BLER is reduced.

Figure 11:
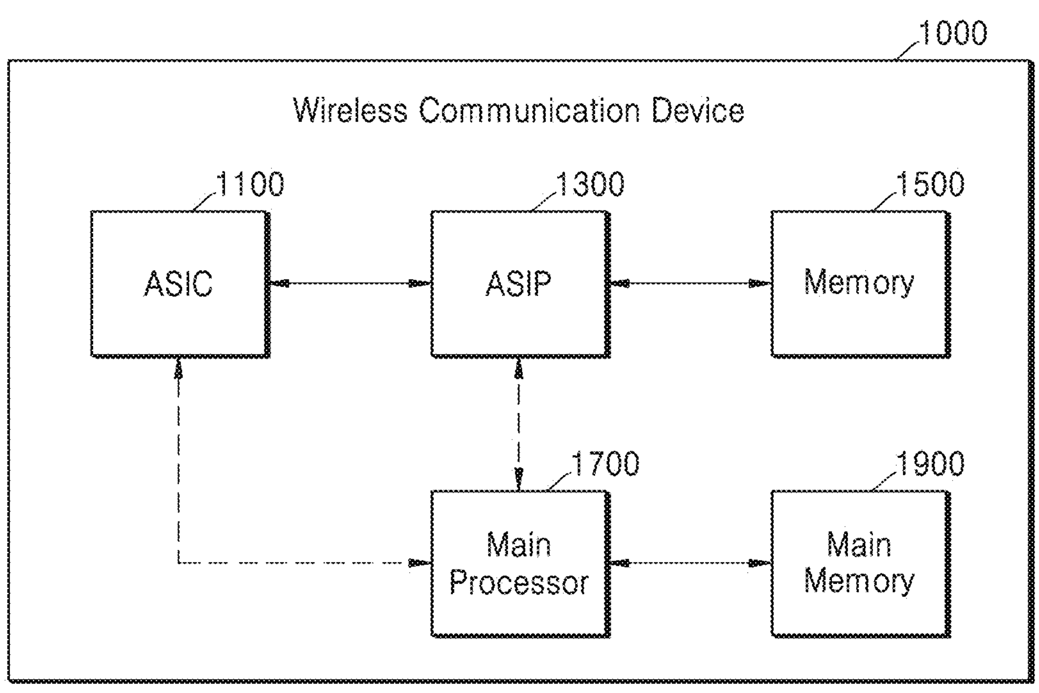
FIG. 11 is a block diagram illustrating a wireless communication device according to another embodiment.

FIG. 11 is a block diagram illustrating a wireless communication device according to another embodiment.

A wireless communication device 1000 illustrated in FIG. 11 may correspond to the wireless communication device 200*a* illustrated in FIG. 2, and redundant descriptions thereof are omitted.

Referring to FIG. 11, the wireless communication device 1000 may include an ASIC 1100, an application specific instruction set processor (ASIP) 1300, a memory 1500, a main processor 1700, and a main memory 1900. At least two of the ASIC 1100, the ASIP 1300, and the main processor 1700 may communicate with each other. Also, at least two of the ASIC 1100, the ASIP 1300, the memory 1500, the main processor 1700, and the main memory 1900 may be embedded in one chip. For example, as described above, at least two of the ASIC 1100, the ASIP 1300, the memory 1500, the main processor 1700, and the main memory 1900 may be included in one modem chip.

The ASIP 1300 is an integrated circuit customized for a certain purpose and may support a dedicated instruction set for a certain application and execute instructions included in the instruction set. The memory 1500 may communicate with the ASIP 1300 and store a plurality of instructions to be executed by the ASIP 1300 as a non-transitory storage device. For example, the memory 1500 may include any type of memory, which is accessible by the ASIP 1300, such as random access memory (RAM), read only memory (ROM), a tape, a magnetic disk, an optical disk, a volatile memory, a non-volatile memory, and a combination thereof but is not limited thereto.

The main processor 1700 may control the wireless communication device 1000 by executing a plurality of instructions. For example, the main processor 1700 may control the ASIC 1100 and the ASIP 1300, process the received data, or process a user input to the wireless communication device 1000. The main memory 1900 may communicate with the main processor 1700 and store a plurality of instructions to be executed by the main processor 1700 as a non-transitory storage device. For example, the main memory 1900 may include any type of memory, which is accessible by the main processor 1700, such as RAM, ROM, a tape, a magnetic disk, an optical disk, a volatile memory, a non-volatile memory, and a combination thereof but is not limited thereto.

The operating method of the wireless communication device according to the embodiment described above with reference to FIGS. 1 to 10 may be performed by at least one of components included in the wireless communication device 1000 of FIG. 11. In some embodiments, at least one of operations included in the operating method of the wireless communication device described above may be performed according to a plurality of instructions stored in the memory 1500. In some embodiments, at least one of the operations included in the operating method described above may be performed by executing a plurality of instructions stored in the memory 1500.

As described above, embodiments are disclosed in the drawings and the inventive concept. In this description, embodiments have been described by using certain terms, but this is only used for the purpose of describing the inventive concept and is not used to limit the meaning or scope of the inventive concept as defined by the claims. Therefore, those of skill in the art will understand that various modifications and other equivalent embodiments may be derived therefrom. Therefore, the true technical protection scope of the inventive concept should be determined by the technical idea of the attached claims.

While the inventive concept has been particularly shown and described with reference to embodiments thereof, it will be understood that various changes in form and details may be made therein without departing from the spirit and scope of the following claims.

What is claimed is:

1. A modem chip comprising:

a radio frequency integrated circuit (RFIC) configured to receive a signal including channel state information; and a processor configured to:

determine a signal to interference ratio (SIR) of the received signal based on the channel state information;

select a log likelihood ratio (LLR) calculation mode among at least two LLR calculation modes that differently calculate an LLR of the received signal by comparing the SIR with at least one threshold; and decode the received signal by calculating the LLR of the received signal based on the selected LLR calculation mode.

2. The modem chip of claim 1, wherein:

the processor generates a linear detection matrix based on the channel state information, and when the SIR is greater than a first threshold, the processor selects a first LLR calculation mode for calculating the LLR based on the linear detection matrix, and the first threshold is the highest threshold among the at least one threshold.

3. The modem chip of claim 2, wherein the linear detection matrix is a minimum mean square error (MMSE) detection matrix.

4. The modem chip of claim 1, wherein, when the SIR is less than a first threshold, the processor selects a second LLR calculation mode for calculating the LLR based on at least one constellation point, and the first threshold is the highest threshold among the at least one threshold.

5. The modem chip of claim 4, wherein the processor calculates the LLR based on a first number of constellation points, the first number of constellation points corresponds to a second threshold less than the SIR among the at least one threshold, and the second threshold is a highest threshold among at least one third threshold that is less than the SIR.

6. The modem chip of claim 4, wherein the LLR is calculated based on a first number of constellation points, the first number of constellation points corresponds to a second threshold greater than the SIR among the at least one threshold, and the second threshold is a smallest threshold among at least one third threshold that is greater than the SIR.

7. The modem chip of claim 4, wherein the LLR is calculated based on a first number of constellation points, and the first number of constellation points is based on a combination of numbers of constellation points respectively corresponding to two thresholds that are closest to the SIR among the at least one threshold.

8. The modem chip of claim 4, wherein a number of constellation points corresponding to the at least one threshold is inversely proportional to a magnitude of a corresponding threshold.

9. The modem chip of claim 4, wherein:

the processor generates a channel matrix with respect to the received signal based on the channel state information, generates a linear detection matrix based on the channel matrix, and generates a reference symbol based on the channel matrix and the linear detection matrix, and the LLR is calculated based on the reference symbol and the at least one constellation point.

10. The modem chip of claim 9, wherein the LLR is calculated based on a Euclidean distance between the reference symbol and the at least one constellation point.

11. An operating method of a modem chip, the operating method comprising:

generating channel state information based on a received signal;

determining a signal to interference ratio (SIR) of the received signal based on the channel state information;

selecting a first threshold that is closest to the SIR among a plurality of thresholds;

selecting a log likelihood ratio (LLR) calculation mode among at least two LLR calculation modes that differently calculate an LLR of the received signal based on the first threshold; and calculating the LLR of the received signal based on the selected LLR calculation mode.

12. The operating method of claim 11, wherein, when the first threshold is a highest threshold among the plurality of thresholds, the selecting of the one LLR calculation mode includes selecting a first LLR calculation mode for calculating the LLR based on a linear detection matrix based on the channel state information, and the calculating of the LLR includes calculating the LLR of the received signal based on the first LLR calculation mode.

13. The operating method of claim 12, wherein the linear detection matrix is a minimum mean square error (MMSE) detection matrix.

14. The operating method of claim 11, wherein:

numbers of constellation points respectively corresponding to the plurality of thresholds are different from each other, and when the first threshold is not the highest threshold among the plurality of thresholds, the selecting of one LLR calculation mode includes selecting a second LLR calculation mode for calculating an LLR based on a first number of constellation points corresponding to the first threshold and a reference symbol corresponding to the received signal, and the calculating of the LLR includes calculating the LLR of the received signal based on the second LLR calculation mode.

15. The operating method of claim 14, wherein the first number of constellation points increases as a difference between the first threshold and a highest threshold among the plurality of thresholds increases.

16. The operating method of claim 14, wherein, in the second LLR calculation mode, the LLR is calculated further based on a second number of constellation points corresponding to a threshold, which is second closest to the SIR, next to the first threshold, among the plurality of thresholds.

17. A modem chip comprising:

a radio frequency integrated circuit (RFIC) configured to receive a signal including channel state information; and a processor configured to generate a channel matrix corresponding to the received signal based on the channel state information, generate a linear detection matrix for detecting a transmission vector included in the received signal based on the channel matrix, and determine a signal to interference ratio (SIR) of the received signal based on the channel matrix and the linear detection matrix, wherein the processor selects a log likelihood ratio (LLR) calculation mode from among at least two LLR calculation modes that differently calculate an LLR of the received signal based on a first threshold that is closest to the SIR among a plurality of thresholds, and decodes the received signal by calculating the LLR of the received signal based on the selected LLR calculation mode.

18. The modem chip of claim 17, wherein, when the first threshold is a highest threshold among the plurality of thresholds, the processor selects a first LLR calculation mode for calculating the LLR based on the channel matrix and the linear detection matrix.

19. The modem chip of claim 17, wherein, when the first threshold is not a highest threshold among the plurality of thresholds, the processor selects a second LLR calculation mode for calculating the LLR based on a first number of constellation points corresponding to the first threshold.

20. The modem chip of claim 19, wherein the first number of constellation points increases as a difference between the first threshold and the highest threshold among the plurality of thresholds increases.

* * * * *